United States Patent
Rached

(10) Patent No.: US 9,732,262 B2
(45) Date of Patent: Aug. 15, 2017

(54) COMPOSITIONS OF 2,4,4,4-TETRAFLUOROBUT-1-ENE AND 1-METHOXYHEPTAFLUOROPROPANE

(71) Applicant: Arkema France, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/388,535

(22) PCT Filed: Mar. 7, 2013

(86) PCT No.: PCT/FR2013/050481
§ 371 (c)(1),
(2) Date: Sep. 26, 2014

(87) PCT Pub. No.: WO2013/144475
PCT Pub. Date: Oct. 3, 2013

(65) Prior Publication Data
US 2015/0052918 A1    Feb. 26, 2015

(30) Foreign Application Priority Data

Mar. 29, 2012 (FR) .................... 12 52834

(51) Int. Cl.
*C09K 5/04* (2006.01)
*F25B 1/00* (2006.01)

(52) U.S. Cl.
CPC .............. *C09K 5/045* (2013.01); *F25B 1/005* (2013.01); *C09K 2205/112* (2013.01); *C09K 2205/126* (2013.01); *C09K 2205/32* (2013.01); *C09K 2205/40* (2013.01)

(58) Field of Classification Search
CPC .............. C09K 5/045; C09K 2205/112; C09K 2205/126; C09K 2205/32
See application file for complete search history.

(56) References Cited

U.S. PATENT DOCUMENTS 8,889,031 B2 *  11/2014  Sawada .................. C09K 5/045
                                                                  252/68
2005/0188697 A1    9/2005  Zyhowski et al.
2012/0085959 A1    4/2012  Uenveren et al.
2012/0202904 A1    8/2012  Chen et al.

FOREIGN PATENT DOCUMENTS

| JP | 10-152452 A | 6/1998 |
| WO | WO 2010/100254 A1 | 9/2010 |
| WO | WO 2011/050017 A1 | 4/2011 |

OTHER PUBLICATIONS

M. S. Kim et al., "A Study to Determine the Existence of an Azeotropic R-22 'Drop-In' Substitute", NISTIR 5784, National Institute of Standards and Technology, Mar. 1996.*
International Search Report (PCT/ISA/210) mailed on Jul. 12, 2013, by the French Patent Office as the International Searching Authority for International Application No. PCT/FR2013/050481.

* cited by examiner

*Primary Examiner* — John Hardee
(74) *Attorney, Agent, or Firm* — Buchanan Ingersoll & Rooney P.C.

(57) ABSTRACT

The invention relates to the use of a composition comprising 2,4,4,4-tetra-fluoro-but-1-ene and 1-methoxyheptafluoropropane as a heat transfer fluid. The invention also relates to associated units, methods and compositions.

22 Claims, 1 Drawing Sheet

COMPOSITIONS OF 2,4,4,4-TETRAFLUOROBUT-1-ENE AND 1-METHOXYHEPTAFLUOROPROPANE

TECHNICAL FIELD

The disclosure relates to compositions of 2,4,4,4-tetrafluorobut-1-ene and 1-methoxyheptafluoropropane and to the use thereof as heat-transfer fluids.

TECHNICAL BACKGROUND

Fluids based on fluorocarbon compounds are widely used in vapor-compression heat-transfer systems, especially air-conditioning, heat-pump, refrigeration or freezing devices. The common feature of these devices is that they are based on a thermodynamic cycle comprising vaporization of the fluid at low pressure (in which the fluid absorbs heat); compression of the vaporized fluid up to a high pressure; condensation of the vaporized fluid to liquid at high pressure (in which the fluid expels heat); and depressurization of the fluid to complete the cycle.

The choice of a heat-transfer fluid (which may be a pure compound or a mixture of compounds) is dictated firstly by the thermodynamic properties of the fluid, and secondly by additional constraints. Thus, a particularly important criterion is that of the environmental impact of the fluid under consideration. In particular, chlorinated compounds (chlorofluorocarbons and hydrochlorofluorocarbons) have the drawback of damaging the ozone layer. Non-chlorinated compounds are therefore now generally preferred, such as hydrofluorocarbons, fluoro ethers and fluoro olefins.

It is also still necessary to develop other heat-transfer fluids which have a global warming potential (GWP) lower than that of the heat-transfer fluids currently used, and which have equivalent or improved performance qualities.

Document US 2005/0 188 697 describes the use of polyfluoro ethers such as 1-methoxyheptafluoropropane (or HFE-7000) as heat-transfer fluid.

Document WO 2010/100 254 describes the use of various tetrafluorobutenes and especially 2,4,4,4-tetrafluorobut-1-ene (HFO-1354mfy), in various applications, including that of heat transfer.

Document WO 2011/050 017 describes the use of HFO-1354mfy as an expansion agent. The document mentions a list of other expansion agents that can optionally be used in combination with HFO-1354mfy. HFE-7000 features in this list.

There is still a need to develop other heat-transfer fluids that are less harmful to the ozone layer and that have a relatively low GWP, in order to replace the usual heat-transfer fluids.

SUMMARY

The disclosure relates to the use of a composition comprising 2,4,4,4-tetrafluorobut-1-ene and 1-methoxyheptafluoropropane as a heat-transfer fluid.

According to one embodiment, the composition comprises from 1% to 99% of 2,4,4,4-tetrafluorobut-1-ene and from 1% to 99% of 1-methoxyheptafluoropropane; and preferably:
from 50% to 98% of 2,4,4,4-tetrafluorobut-1-ene and from 2% to 50% of 1-methoxyheptafluoropropane; more particularly preferably from 75% to 97% of 2,4,4,4-tetrafluorobut-1-ene and from 3% to 25% of 1-methoxyheptafluoropropane; and ideally from 85% to 95% of 2,4,4,4-tetrafluorobut-1-ene and from 5% to 15% of 1-methoxyheptafluoropropane; or
from 20% to 99% of 2,4,4,4-tetrafluorobut-1-ene and from 1% to 80% of 1-methoxyheptafluoropropane; more particularly preferably from 30% to 95% of 2,4,4,4-tetrafluorobut-1-ene and from 5% to 70% of 1-methoxyheptafluoropropane; and ideally from 65% to 90% of 2,4,4,4-tetrafluorobut-1-ene and from 10% to 35% of 1-methoxyheptafluoropropane; or
from 1% to 30% of 2,4,4,4-tetrafluorobut-1-ene and from 70% to 99% of 1-methoxyheptafluoropropane and ideally from 5% to 20% of 2,4,4,4-tetrafluorobut-1-ene and from 80% to 95% of 1-methoxyheptafluoropropane.

According to one embodiment, the composition consists of a mixture of 2,4,4,4-tetrafluorobut-1-ene and 1-methoxyheptafluoropropane.

According to one embodiment, the composition is quasi-azeotropic and is preferably azeotropic.

According to one embodiment, the composition is non-flammable.

The disclosure also relates to a heat-transfer composition comprising:
a heat-transfer fluid comprising 2,4,4,4-tetrafluorobut-1-ene and 1-methoxyheptafluoropropane; and
one or more additives chosen from lubricants, stabilizers, surfactants, tracers, fluorescers, odorous agents and solubilizers, and mixtures thereof.

According to one embodiment, the heat-transfer fluid comprises from 1% to 99% of 2,4,4,4-tetrafluorobut-1-ene and from 1% to 99% of 1-methoxyheptafluoropropane; preferably:
from 50% to 98% of 2,4,4,4-tetrafluorobut-1-ene and from 2% to 50% of 1-methoxyheptafluoropropane; more particularly preferably from 75% to 97% of 2,4,4,4-tetrafluorobut-1-ene and from 3% to 25% of 1-methoxyheptafluoropropane; and ideally from 85% to 95% of 2,4,4,4-tetrafluorobut-1-ene and from 5% to 15% of 1-methoxyheptafluoropropane; or
from 20% to 99% of 2,4,4,4-tetrafluorobut-1-ene and from 1% to 80% of 1-methoxyheptafluoropropane; more particularly preferably from 30% to 95% of 2,4,4,4-tetrafluorobut-1-ene and from 5% to 70% of 1-methoxyheptafluoropropane; and ideally from 65% to 90% of 2,4,4,4-tetrafluorobut-1-ene and from 10% to 35% of 1-methoxyheptafluoropropane; or
from 1% to 30% of 2,4,4,4-tetrafluorobut-1-ene and from 70% to 99% of 1-methoxyheptafluoropropane and ideally from 5% to 20% of 2,4,4,4-tetrafluorobut-1-ene and from 80% to 95% of 1-methoxyheptafluoropropane.

According to one embodiment, the heat-transfer fluid consists of a mixture of 2,4,4,4-tetrafluorobut-1-ene and 1-methoxyheptafluoropropane.

According to one embodiment, the heat-transfer fluid is quasi-azeotropic and is preferably azeotropic; and/or the heat-transfer fluid is non-flammable.

The disclosure also relates to a heat-transfer installation comprising a vapor compression circuit containing a composition as described above as heat-transfer fluid or containing a heat-transfer composition as described above.

According to one embodiment, the installation is chosen from mobile or stationary heat-pump heating, air-conditioning, and especially motor vehicle air-conditioning or centralized stationary air-conditioning, refrigeration, freezing and Rankine-cycle installations, and is preferably an air-conditioning installation.

The disclosure also relates to a process for heating or cooling a fluid or a body by means of a vapor compression circuit containing a heat-transfer fluid, said process successively comprising evaporation of the heat-transfer fluid, compression of the heat-transfer fluid, condensation of the heat-transfer fluid and depressurization of the heat-transfer fluid, in which the heat-transfer fluid is a composition as mentioned above.

The disclosure also relates to a process for reducing the environmental impact of a heat-transfer installation comprising a vapor compression circuit containing an initial heat-transfer fluid, said process comprising a step of replacing the initial heat-transfer fluid in the vapor compression circuit with a final heat-transfer fluid, the final heat-transfer fluid having a lower GWP than the initial heat-transfer fluid, in which the final heat-transfer fluid is a composition as mentioned above; and in which, preferably, the initial heat-transfer fluid is 2,2-dichloro-1,1,1-trifluoroethane.

The disclosure also relates to a composition comprising from 1% to 99% of 2,4,4,4-tetrafluorobut-1-ene and 1% to 99% of 1-methoxyheptafluoropropane; and preferably comprising:

from 50% to 98% of 2,4,4,4-tetrafluorobut-1-ene and 2% to 50% of 1-methoxyheptafluoropropane; more particularly preferably from 75% to 97% of 2,4,4,4-tetrafluorobut-1-ene and 3% to 25% of 1-methoxyheptafluoropropane; and ideally from 85% to 95% of 2,4,4,4-tetrafluorobut-1-ene and 5% to 15% of 1-methoxyheptafluoropropane; or from 20% to 99% of 2,4,4,4-tetrafluorobut-1-ene and 1% to 80% of 1-methoxyheptafluoropropane; more particularly preferably from 30% to 95% of 2,4,4,4-tetrafluorobut-1-ene and 5% to 70% of 1-methoxyheptafluoropropane; and ideally from 65% to 90% of 2,4,4,4-tetrafluorobut-1-ene and 10% to 35% of 1-methoxyheptafluoropropane; or from 1% to 30% of 2,4,4,4-tetrafluorobut-1-ene and 70% to 99% of 1-methoxyheptafluoropropane and ideally from 5% to 20% of 2,4,4,4-tetrafluorobut-1-ene and 80% to 95% of 1-methoxyheptafluoropropane.

According to one embodiment, the composition consists of a mixture of 2,4,4,4-tetrafluorobut-1-ene and 1-methoxyheptafluoropropane.

According to one embodiment, the composition is quasi-azeotropic, and is preferably azeotropic.

According to one embodiment, the composition is non-flammable.

The disclosure makes it possible to satisfy the needs felt in the prior art. It more particularly provides novel compositions with a low GWP which are not harmful to the ozone layer and which may be used (inter alia) as heat-transfer fluids, especially in replacement for the usual heat-transfer fluids, and most particularly for 2,2-dichloro-1,1,1-trifluoroethane (HCFC-123).

In particular, the disclosure provides, in certain embodiments, azeotropic or quasi-azeotropic compositions.

In certain embodiments, the disclosure provides heat-transfer fluids that have equivalent or improved energy performance qualities when compared with the usual heat-transfer fluids and especially HCFC-123.

In certain embodiments, the compositions according to the disclosure especially may have an equivalent or improved volume capacity and/or an equivalent or improved performance coefficient when compared with the compositions of the prior art. According to certain embodiments, the replacement of HCFC-123 may be performed without modification of the heat-transfer installation or of its operating parameters.

In certain embodiments, the disclosure provides heat-transfer fluids that are less flammable and/or less toxic than those of the prior art. In particular, these heat-transfer fluids may be less flammable than pure HFO-1354mfy and less toxic than pure HFE-7000.

DETAILED DESCRIPTION OF EMBODIMENTS

Figure 1:
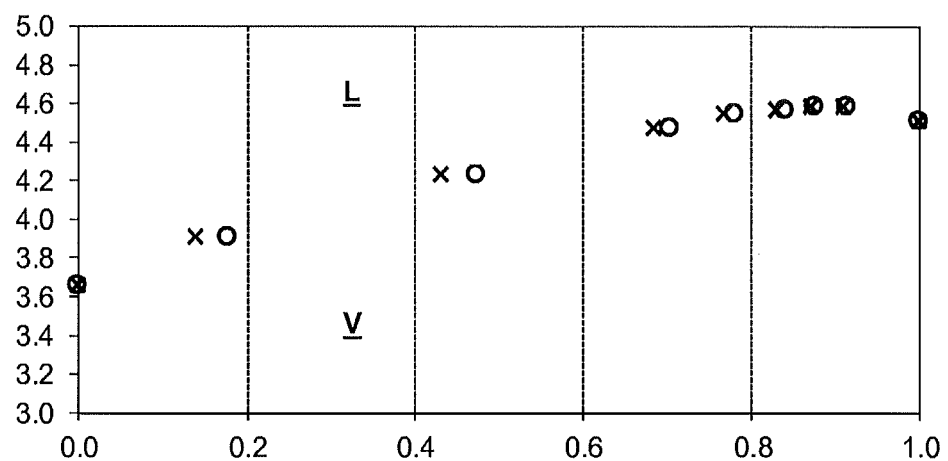
FIG. 1 shows the liquid/vapor equilibrium curve for the HFO-1354mfy/HFE-7000 binary mixture. The mole proportion of HFO-1354mfy in the mixture is given on the x-axis, and the pressure in bar is given on the y-axis. The data relating to the liquid are represented by crosses, and the data relating to the gases by circles. The liquid domain of the graph is noted L, and the vapor domain is noted V.

The disclosure is now described in greater detail and without limitation in the description that follows.

Unless otherwise mentioned, throughout the application the indicated proportions of compounds are given as mole percentages.

According to the present patent application, the global warming potential (GWP) is defined relative to carbon dioxide and relative to a duration of 100 years, according to the method indicated in "The scientific assessment of ozone depletion, 2002, a report of the World Meteorological Association's Global Ozone Research and Monitoring Project".

The term "heat-transfer compound" or, respectively, "heat-transfer fluid" (or coolant fluid) means a compound or, respectively, a fluid that is capable of absorbing heat by evaporating at low temperature and low pressure and of expelling heat by condensing at high temperature and high pressure, in a vapor compression circuit. In general, a heat-transfer fluid may comprise one, two, three or more than three heat-transfer compounds.

The term "heat-transfer composition" means a composition comprising a heat-transfer fluid and optionally one or more additives that are not heat-transfer compounds for the intended application.

The additives may especially be chosen from lubricants, nanoparticles, stabilizers, surfactants, tracers, fluorescers, odorous agents and solubilizers.

The stabilizer(s), when they are present, preferably represent not more than 5% by mass in the heat-transfer composition. Among the stabilizers, mention may be made especially of nitromethane, ascorbic acid, terephthalic acid, azoles such as tolutriazole or benzotriazole, phenolic compounds such as tocopherol, hydroquinone, t-butylhydroquinone, 2,6-di-tert-butyl-4-methylphenol, epoxides (optionally fluorinated or perfluorinated alkyl, or alkenyl or aromatic) such as n-butyl glycidyl ether, hexanediol diglycidyl ether, allyl glycidyl ether or butylphenyl glycidyl ether, phosphites, phosphonates, thiols and lactones.

As lubricants, use may be made especially of oils of mineral origin, silicone oils, paraffins of natural origin, naphthenes, synthetic paraffins, alkylbenzenes, poly-α-olefins, polyalkylene glycols, polyol esters and/or polyvinyl ethers. The mixture has improved stability with polyol ester and polyvinyl ether oils.

As nanoparticles, use may be made especially of nanoparticles of carbon, metal (copper, aluminum) oxides, $TiO_2$, $Al_2O_3$, $MoS_2$, etc.

As tracers (which can be detected), mention may be made of deuterated or non-deuterated hydrofluorocarbons, deuterated hydrocarbons, perfluorocarbons, fluoro ethers, bromo compounds, iodo compounds, alcohols, aldehydes, ketones, nitrous oxide and combinations thereof. The tracer is different from the heat-transfer compound(s) of which the heat-transfer fluid is composed.

Solubilizers that may be mentioned include hydrocarbons, dimethyl ether, polyoxyalkylene ethers, amides, ketones, nitriles, chlorocarbons, esters, lactones, aryl ethers, fluoro ethers and 1,1,1-trifluoroalkanes. The solubilizer is different from the heat-transfer compound(s) of which the heat-transfer fluid is composed.

Fluorescers that may be mentioned include naphthalimides, perylenes, coumarins, anthracenes, phenanthracenes, xanthenes, thioxanthenes, naphthoxanthenes and fluoresceins, and derivatives and combinations thereof.

Odorous agents that may be mentioned include alkylacrylates, allylacrylates, acrylic acids, acrylic esters, alkyl ethers, alkyl esters, alkynes, aldehydes, thiols, thio ethers, disulfides, allylisothiocyanates, alkanoic acids, amines, norbornenes, norbornene derivatives, cyclohexene, heterocyclic aromatic compounds, ascaridole and o-methoxy(methyl) phenol, and combinations thereof.

The heat-transfer process according to the disclosure is based on the use of an installation comprising a vapor compression circuit which contains a heat-transfer fluid. The heat-transfer process may be a process for heating or cooling a fluid or a body.

The vapor compression circuit containing a heat-transfer fluid comprises at least one evaporator, a compressor, a condenser and a depressurizer, and also lines for transporting the heat-transfer fluid between these components. The evaporator and the condenser comprise a heat exchanger for exchanging heat between the heat-transfer fluid and another fluid or body.

As compressor, use may be made especially of a single-stage or multi-stage centrifugal compressor or a centrifugal mini-compressor. Rotary, piston or screw compressors may also be used. The compressor may be driven by an electric motor or by a gas turbine (for example fed with the exhaust gases of a vehicle, or mobile applications) or by gearing.

The installation may comprise an electricity-generating turbine (Rankine cycle).

The installation may also optionally comprise at least one heat-exchange fluid used for transmitting heat (with or without a change of state) between the heat-transfer fluid circuit and the fluid or body to be heated or cooled.

The installation may also optionally comprise two (or more) vapor compression circuits, containing identical or different heat-transfer fluids. For example, the vapor compression circuits may be coupled together.

The vapor compression circuit operates according to a standard vapor compression cycle. The cycle comprises the change of state of the heat-transfer fluid from a liquid phase (or liquid/vapor two-phase system) to a vapor phase at a relatively low pressure, followed by compression of the fluid in vapor phase up to a relatively high pressure, the change of state (condensation) of the heat-transfer fluid from the vapor phase to the liquid phase at a relatively high pressure, and reduction of the pressure to recommence the cycle.

In the case of a cooling process, heat derived from the fluid or body that is being cooled (directly or indirectly, via a heat-exchange fluid) is adsorbed by the heat-transfer fluid, during the evaporation of the latter, this taking place at a relatively low temperature relative to the environment. The cooling processes comprise air-conditioning processes (with mobile installations, for example in vehicles, or stationary installations), refrigeration and freezing processes or cryogenic processes.

In the case of a heating process, heat is yielded (directly or indirectly, via a heat-exchange fluid) from the heat-transfer fluid, during the condensation of the latter, to the fluid or body that is being heated, this taking place at a relatively high temperature relative to the environment. In this case, the installation for transferring heat is known as a "heat pump".

It is possible to use any type of heat exchanger for the implementation of the heat-transfer fluids according to the disclosure, and especially co-current heat exchangers or, preferably, counter-current heat exchangers.

The heat-transfer fluids used in the context of the disclosure are compositions comprising 2,4,4,4-tetrafluorobut-1-ene (HFO-1354mfy) and 1-methoxyheptafluoropropane (HFE-7000).

According to one embodiment, these heat-transfer fluids may comprise one or more additional heat-transfer compounds.

These additional heat-transfer compounds may be chosen especially from hydrocarbons, hydrofluorocarbons, ethers, hydrofluoroethers and fluoroolefins.

According to particular embodiments, the heat-transfer fluids according to the disclosure may be ternary compositions (consisting of three heat-transfer compounds) or quaternary compositions (consisting of four heat-transfer compounds), in combination with the lubricant oil to form the heat-transfer compositions according to the disclosure.

When additional heat-transfer compounds are present, it is preferred that their total proportion in the above heat-transfer fluids be less than or equal to 20%, or to 15%, or to 10%, or to 5%, or to 2%.

According to one embodiment, the heat-transfer fluids consist essentially of a mixture of HFO-1354mfy and HFE-7000, or even consist of such a mixture (binary compositions).

Impurities may be present in such heat-transfer fluids, in a proportion of less than 1%, preferably less than 0.5%, preferably less than 0.1%, preferably less than 0.05% and preferably less than 0.01%.

According to particular embodiments, the proportion of HFO-1354mfy in the heat-transfer fluid may be: from 0.1% to 5%; or from 5% to 10%; or from 10% to 15%; or from 15% to 20%; or from 20% to 25%; or from 25% to 30%; or from 30% to 35%; or from 35% to 40%; or from 40% to 45%; or from 45% to 50%; or from 50% to 55%; or from 55% to 60%; or from 60% to 65%; or from 65% to 70%; or from 70% to 75%; or from 75% to 80%; or from 80% to 85%; or from 85% to 90%; or from 90% to 95%; or from 95% to 99.9%.

According to particular embodiments, the proportion of HFE-7000 in the heat-transfer fluid may be: 0.1% to 5%; or from 5% to 10%; or from 10% to 15%; or from 15% to 20%; or from 20% to 25%; or from 25% to 30%; or from 30% to 35%; or from 35% to 40%; or from 40% to 45%; or from 45% to 50%; or from 50% to 55%; or from 55% to 60%; or from 60% to 65%; or from 65% to 70%; or from 70% to 75%; or from 75% to 80%; or from 80% to 85%; or from 85% to 90%; or from 90% to 95%; or from 95% to 99.9%.

Among the above heat-transfer fluids, some have the advantage of being azeotropic or quasi-azeotropic.

The term "quasi-azeotropic" denotes compositions for which, at constant temperature, the liquid saturation pressure and the vapor saturation pressure are virtually identical (the maximum pressure difference being less than 10%, or even advantageously 5%, relative to the liquid saturation pressure).

For "azeotropic" compositions, at constant temperature, the maximum pressure difference is in the region of 0%.

Such heat-transfer fluids have the advantage of being easy to use. In the absence of a significant temperature glide, there is no significant change in the circulating composition, and similarly no significant change in the composition in the event of a leak.

FIG. 1 shows the liquid/vapor equilibrium curve for the mixture of HFO-1354mfy and HFE-7000. It is noted that at 75° C. and that about 4.6 bar, the mixture has an azeotrope for about 90% HFO-1354mfy and 10% HFE-7000, and that it is quasi-azeotropic for all the other binary compositions.

Advantageously, the compositions according to the disclosure are non-flammable, under the terms of the standard ASHRAE 34-2007, and preferably with a test temperature of 60° C. instead of 100° C.

In addition, certain compositions according to the disclosure have improved performance qualities when compared with certain known heat-transfer fluids, in particular for moderate-temperature cooling processes, i.e. those in which the temperature of the cooled fluid or body is from −15° C. to 15° C., preferably from −10° C. to 10° C. and more particularly preferably from −5° C. to 5° C. (ideally about 0° C.).

Moreover, certain compositions according to the disclosure have improved performance qualities when compared with certain known heat-transfer fluids, in particular for moderate-temperature heating processes, i.e. those in which the temperature of the heated fluid or body is from 30° C. to 80° C., preferably from 35° C. to 55° C. and more particularly preferably from 40° C. to 50° C. (ideally about 45° C.).

In the "moderate-temperature cooling or heating" processes mentioned above, the inlet temperature of the heat-transfer fluid into the evaporator is preferably from −20° C. to 10° C., especially from −15° C. to 5° C., more particularly preferably from −10° C. to 0° C., for example about −5° C.; and the condensation start temperature of the heat-transfer fluid in the condenser is preferably from 25° C. to 90° C., especially from 30° C. to 70° C., more particularly preferably from 35° C. to 55° C., for example about 50° C. These processes may be refrigeration, air-conditioning or heating processes.

Certain compositions are also suitable for high-temperature heating processes, i.e. those in which the temperature of the heated fluid or body is greater than 90° C., for example greater than or equal to 110° C. or greater than or equal to 130° C., and preferably less than or equal to 170° C.

Certain compositions are also suitable for electricity production processes (Rankine cycle), which are processes in which the temperature of the hot source (heated fluid or body) is greater than 90° C., for example greater than or equal to 110° C. or greater than or equal to 130° C., and preferably less than or equal to 170° C.

Certain compositions according to the disclosure have improved performance qualities when compared with certain known heat-transfer fluids, in particular for low-temperature refrigeration processes, i.e. those in which the temperature of the cooled fluid or body is from −40° C. to −10° C., preferably from −35° C. to −25° C. and more particularly preferably from −30° C. to −20° C. (ideally about −25° C.).

In the "low-temperature refrigeration" processes mentioned above, the inlet temperature of the heat-transfer fluid into the evaporator is preferably from −45° C. to −15° C., especially from −40° C. to −20° C. and more particularly preferably from −35° C. to −25° C., for example about −30° C.; and the condensation start temperature of the heat-transfer fluid in the condenser is preferably from 25° C. to 80° C., especially from 30° C. to 60° C. and more particularly preferably from 35° C. to 55° C., for example about 40° C.

The compositions according to the disclosure may serve to replace various heat-transfer fluids in various heat transfer applications, for example in air conditioning. For example, the compositions according to the disclosure may serve to replace:

1,1,1,2-tetrafluoroethane (R134a);
1,1-difluoroethane (R152a);
1,1,1,3,3-pentafluoropropane (R245fa);
mixtures of pentafluoroethane (R125), 1,1,1,2-tetrafluoroethane (R134a) and isobutane (R600a), namely R422;
chlorodifluoromethane (R22);
the mixture of 51.2% chloropentafluoroethane (R115) and 48.8% chlorodifluoromethane (R22), namely R502;
any hydrocarbon;
the mixture of 20% difluoromethane (R32), 40% pentafluoroethane (R125) and 40% 1,1,1,2-tetrafluoroethane (R134a), namely R407A;
the mixture of 23% difluoromethane (R32), 25% pentafluoroethane (R125) and 52% 1,1,1,2-tetrafluoroethane (R134a), namely R407C;
the mixture of 30% difluoromethane (R32), 30% pentafluoroethane (R125) and 40% 1,1,1,2-tetrafluoroethane (R134a), namely R407F;
R1234yf (2,3,3,3-tetrafluoropropene);
R1234ze (1,3,3,3-tetrafluoropropene).

In addition, the following preferred compositions are most particularly suitable for placing HCFC-123:

from 20% to 99% of HFO-1354mfy and from 1% to 80% of HFE-7000;
preferably from 30% to 95% of HFO-1354mfy and from 5% to 70% of HFE-7000;
more particularly from 65% to 90% of HFO-1354mfy and from 10% to 35% of HFE-7000.

Specifically, in this case, the average molar mass and similarly the boiling point of the heat-transfer fluid are very close to the molar mass and the boiling point of HCFC-123. Thus, the composition comprising 65% and HFO-1354mfy and about 35% HFE-7000 has an average molar mass of 153 g/mol (as opposed to 152.93 g/mol for HCFC-123) and the boiling point equivalent to the boiling point of HCFC-123.

Thus, the preferred compositions above allow a replacement of HCFC-123 without modification or virtually without modification of the heat-transfer installation or of its operating parameters.

Accordingly, these preferred compositions are particularly suitable for any application in which HCFC-123 is generally used. Thus, these preferred compositions are particularly suitable for use as heat-transfer fluids in heat-transfer installations comprising centrifugal compressors, and especially direct drive centrifugal compressors. These compressors are more efficient and less expensive than compressors with a gearbox.

The centrifugal compressors may be driven by an electric motor, a steam turbine, a gas turbine, a heat engine or the like.

Preferably, the speed of sound obtained is close to that obtained with HCFC-123 and/or the volume capacity obtained is close to that obtained with HCFC-123 and/or the condenser operating pressure obtained is close to that obtained with HCFC-123.

Thus, the preferred compositions above may make it possible to maintain a constant compressor spin speed during the replacement of HCFC-123.

Other particularly preferred compositions are compositions comprising from 1% to 30% of 2,4,4,4-tetrafluorobut-1-ene and from 70% to 99% of 1-methoxyheptafluoropropane and ideally from 5% to 20% of 2,4,4,4-tetrafluorobut-1-ene and from 80% to 95% of 1-methoxyheptafluoropropane. Specifically, these compositions have particularly satisfactory non-flammability properties.

Example: Determination of the Liquid/Vapor Equilibrium Curve

The curve of FIG. 1 is obtained in the following manner.

Apparatus based on the static analytical technique for studying binary mixtures of HFO-1354mfy and HFE-7000 is used.

More specifically, an equilibrium cell is used comprising a sapphire tube equipped with two electromagnetic ROLSI™ samplers. It is immersed in a cryothermostat bath (Huber HS40). A field-driven magnetic stirrer rotating at variable speed is used to accelerate the establishment of the equilibria.

Analysis of the samples is performed by gas chromatography (HP 5890 series II) using a catharometer (TCD). Introduction into the cell of the product having the lowest vapor pressure is commenced (heavy product—highest boiling point, in this case HFE-7000). The introduction is performed via the bottom, so as to avoid drops of liquid on the vapor sampling capillary (top of the cell). Introduction of the heavy product is gradually continued so as to obtain a sufficient level of liquid in the cell.

After each sample withdrawal, a mass of light product (in this case HFO-1354mfy) is added in order to vary the concentration and to be able to plot the equilibrium curves. The system is allowed to reach stabilization (temperature and pressure) after each introduction of light product.

The liquid withdrawal takes place via the capillary at the bottom of the cell, and the gas withdrawal takes place at the top of the cell using ROLSI™s (sampler). The opening time of the ROLSIs is chosen by the operator. The ROLSI™s send the samples directly for GC analysis.

The amounts of samples taken at each sampling are small enough so as not to significantly perturb the equilibrium in the cell (about 1 mg, whereas the cell contains from about 15 to 40 g product). Preliminary purges are necessary in order to avoid erroneous values.

The temperature and pressure values are always noted before starting the sample withdrawals; the conditions are considered to be identical for each point.

After each introduction, a small amount of degassing of the vapor phase is necessary before taking the samples.

By means of the prior GC calibration with pure product, the number of moles of each product is found and the mole percentage is deduced therefrom for all the liquid and vapor sample withdrawals.

The invention claimed is:

1. A heat-transfer fluid consisting of from 50% to 98% of 2,4,4,4-tetrafluorobut-1-ene and from 2% to 50% of 1-methoxyheptafluoropropane, wherein the heat-transfer fluid is configured for heating or cooling, and wherein the heat transfer fluid is azeotropic.

2. The heat transfer fluid as claimed in claim 1, in which the heat transfer fluid consists of from 70% to 98% of 2,4,4,4-tetrafluorobut-1-ene and from 2% to 30% of 1-methoxyheptafluoropropane.

3. The heat transfer fluid as claimed in claim 1, in which the heat transfer fluid is non-flammable.

4. The heat transfer fluid as claimed in claim 1, in which the heat transfer fluid consists of from 75% to 97% of 2,4,4,4-tetrafluorobut-1-ene and from 3% to 25% of 1-methoxyheptafluoropropane.

5. The heat transfer fluid as claimed in claim 1, in which the heat transfer fluid consists of from 85% to 95% of 2,4,4,4-tetrafluorobut-1-ene and from 5% to 15% of 1-methoxyheptafluoropropane.

6. The heat transfer fluid as claimed in claim 1, in which the heat transfer fluid consists of from 80% to 98% of 2,4,4,4-tetrafluorobut-1-ene and from 2% to 20% of 1-methoxyheptafluoropropane.

7. The heat transfer fluid as claimed in claim 1, in which the heat transfer fluid consists of about 90% of 2,4,4,4-tetrafluorobut-1-ene and about 10% of 1-methoxyheptafluoropropane.

8. The heat transfer fluid as claimed in claim 1, in which the heat transfer fluid consists of from 65% to 90% of 2,4,4,4-tetrafluorobut-1-ene and from 10% to 35% of 1-methoxyheptafluoropropane.

9. The heat transfer fluid as claimed in claim 1, in which the heat transfer fluid consists of from 65% to 98% of 2,4,4,4-tetrafluorobut-1-ene and from 2% to 35% of 1-methoxyheptafluoropropane.

10. A heat-transfer installation comprising a vapor compression circuit containing the heat transfer fluid as claimed in claim 1.

11. The installation as claimed in claim 10, which is chosen from mobile or stationary heat-pump heating, air-conditioning, and especially motor vehicle air-conditioning or centralized stationary air-conditioning, refrigeration, freezing and Rankine cycle installations.

12. A process for heating or cooling the fluid or a body by means of a vapor compression circuit containing a heat-transfer fluid, said process successively comprising evaporation of the heat-transfer fluid, compression of the heat-transfer fluid, condensation of the heat fluid and depressurization of the heat-transfer fluid, in which the heat-transfer fluid is as claimed in claim 1.

13. A process for reducing the environmental impact of a heat-transfer installation comprising a vapor compression circuit containing an initial heat-transfer fluid, said process comprising a step of replacing the initial heat-transfer fluid in the vapor compression circuit with a final transfer fluid, the final transfer fluid having a lower GWP than the initial heat-transfer fluid, in which the final heat-transfer fluid is as claimed in claim 1.

14. A heat-transfer composition comprising:
a heat-transfer fluid consisting of from 50% to 98% of 2,4,4,4-tetrafluorobut-1-ene and from 2% to 50% of 1-methoxyheptafluoropropane; and
one or more additives chosen from lubricants, stabilizers, surfactants, tracers, fluorescers, odorous agents and solubilizers, and mixtures thereof,
wherein the heat-transfer fluid is azeotropic.

15. The heat-transfer composition as claimed in claim 14, in which the heat transfer fluid consists of from 70% to 98% of 2,4,4,4-tetrafluorobut-1-ene and from 2% to 30% of 1-methoxyheptafluoropropane.

16. The heat-transfer composition as claimed in claim 14 in which the heat-transfer fluid is non-flammable.

17. The heat-transfer composition as claimed in claim 14, in which the heat-transfer fluid consists of from 75% to 97% of 2,4,4,4-tetrafluorobut-1-ene and from 3% to 25% of 1-methoxyheptafluoropropane.

18. The heat-transfer composition as claimed in claim 14, in which the heat-transfer fluid consists of from 85% to 95% of 2,4,4,4-tetrafluorobut-1-ene and from 5% to 15% of 1-methoxyheptafluoropropane.

19. The heat-transfer composition as claimed in claim 14, in which the heat-transfer fluid consists of from 80% to 98% of 2,4,4,4-tetrafluorobut-1-ene and from 2% to 20% of 1-methoxyheptafluoropropane.

20. The heat-transfer composition as claimed in claim 14, in which the heat-transfer fluid consists of from 30% to 95% of 2,4,4,4-tetrafluorobut-1-ene and from 5% to 70% of 1-methoxyheptafluoropropane.

21. The heat-transfer composition as claimed in claim 14, in which the heat-transfer fluid consists of about 90% of 2,4,4,4-tetrafluorobut-1-ene and about 10% of 1-methoxyheptafluoropropane.

22. The heat-transfer composition as claimed in claim 14, in which the heat transfer fluid consists of from 65% to 98% of 2,4,4,4-tetrafluorobut-1-ene and from 2% to 35% of 1-methoxyheptafluoropropane.

\* \* \* \* \*